Patented Oct. 26, 1943

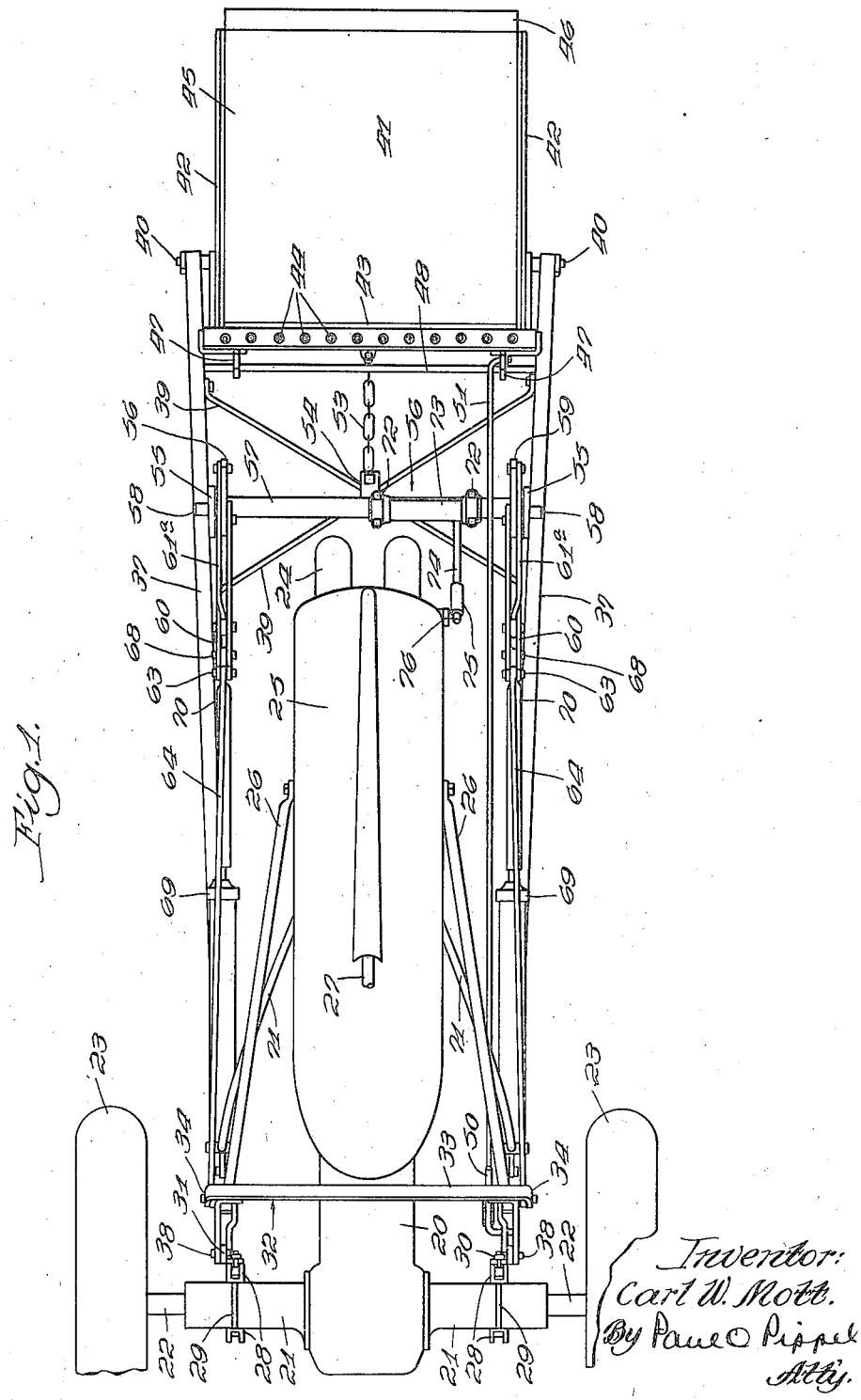

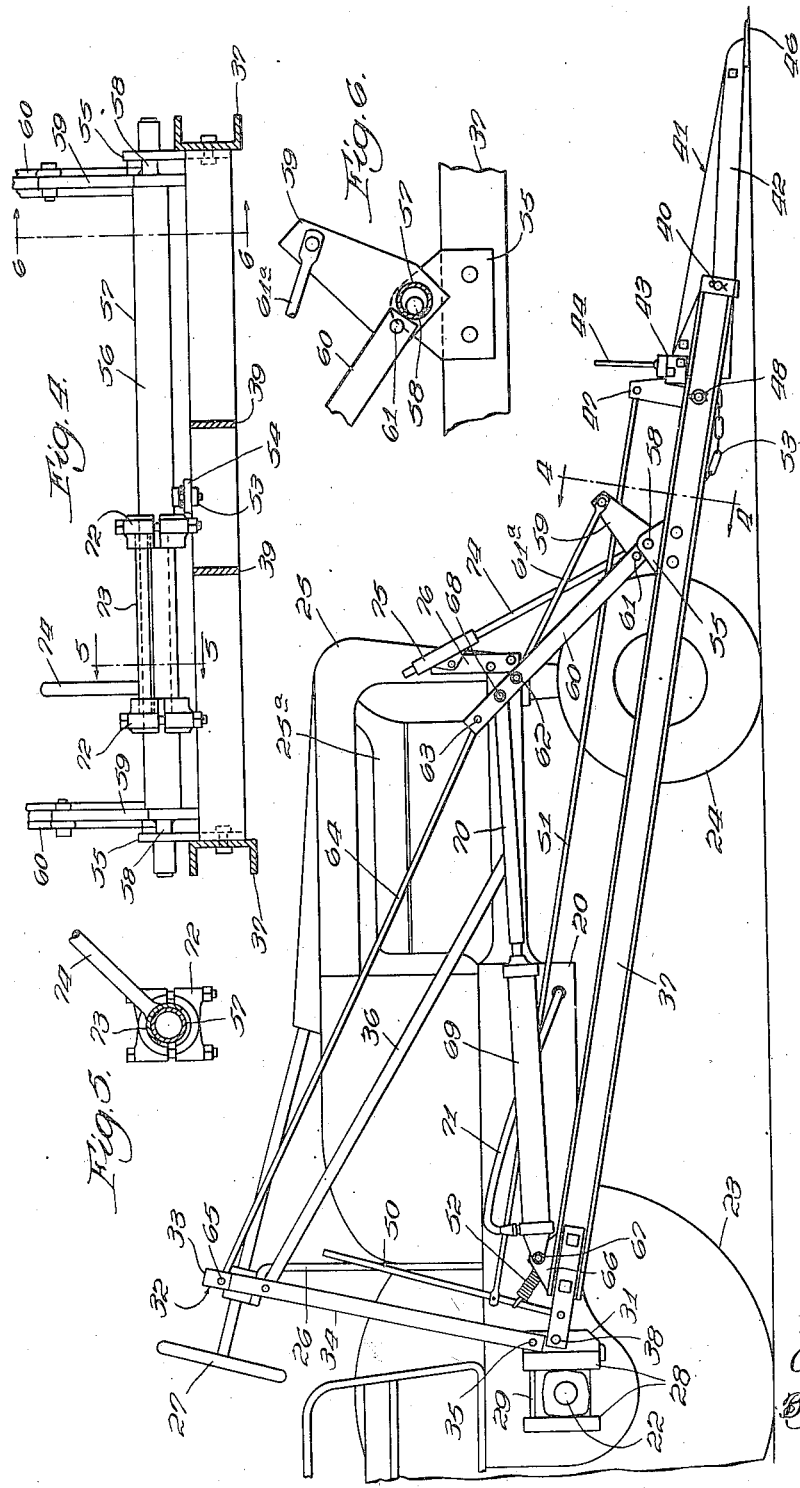

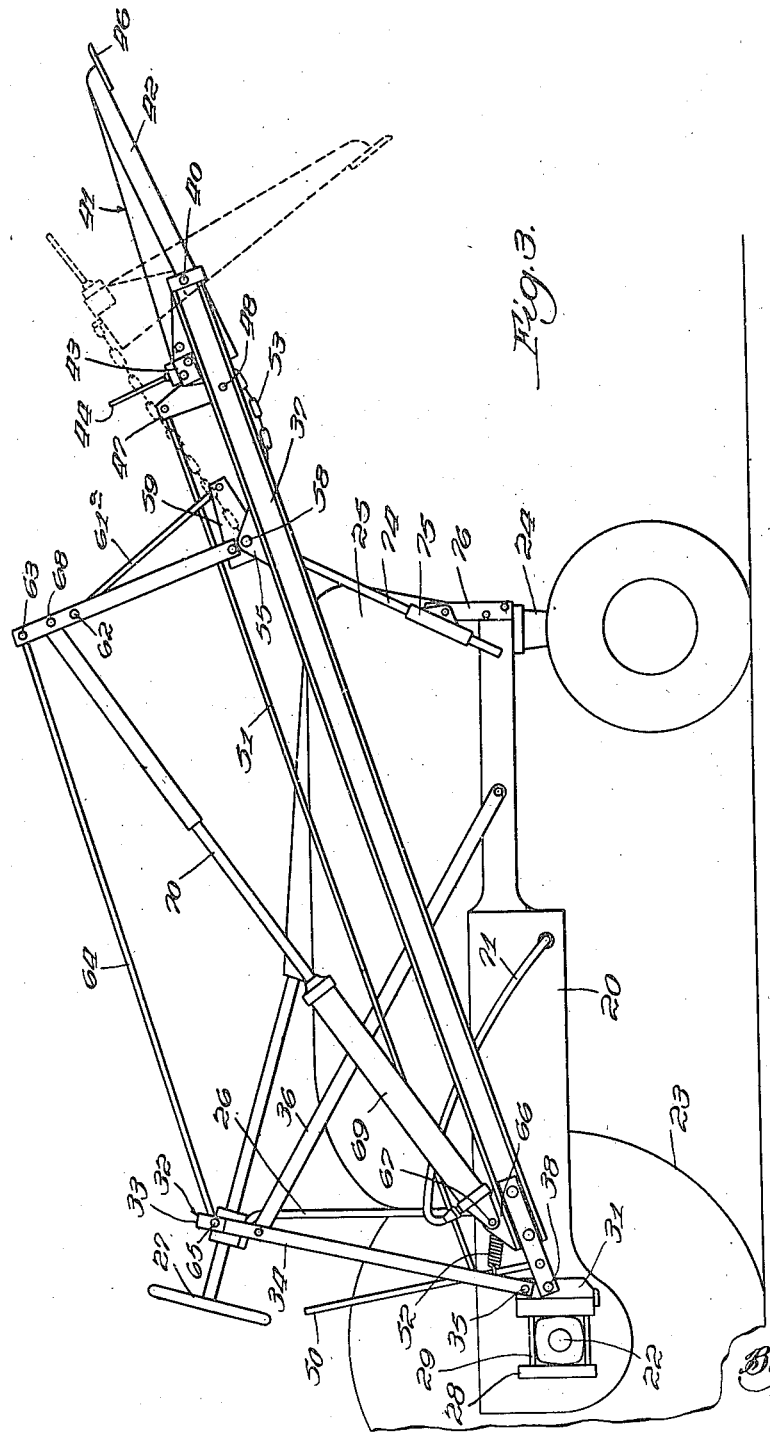

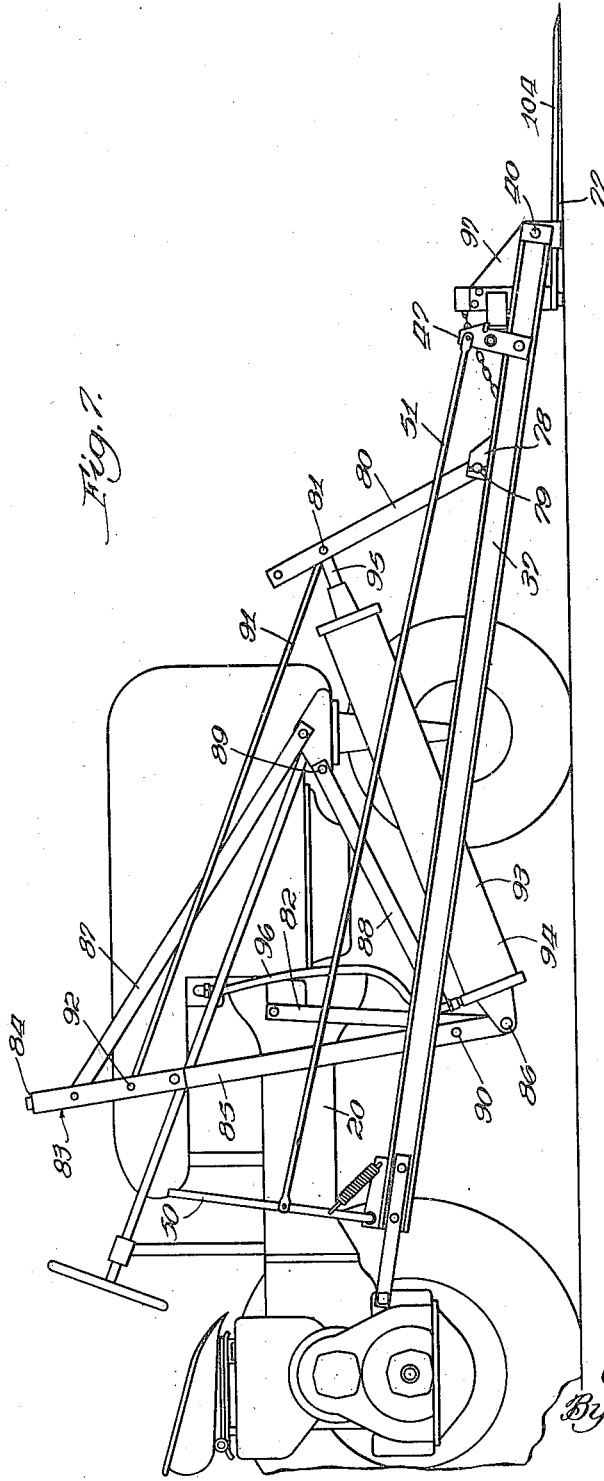

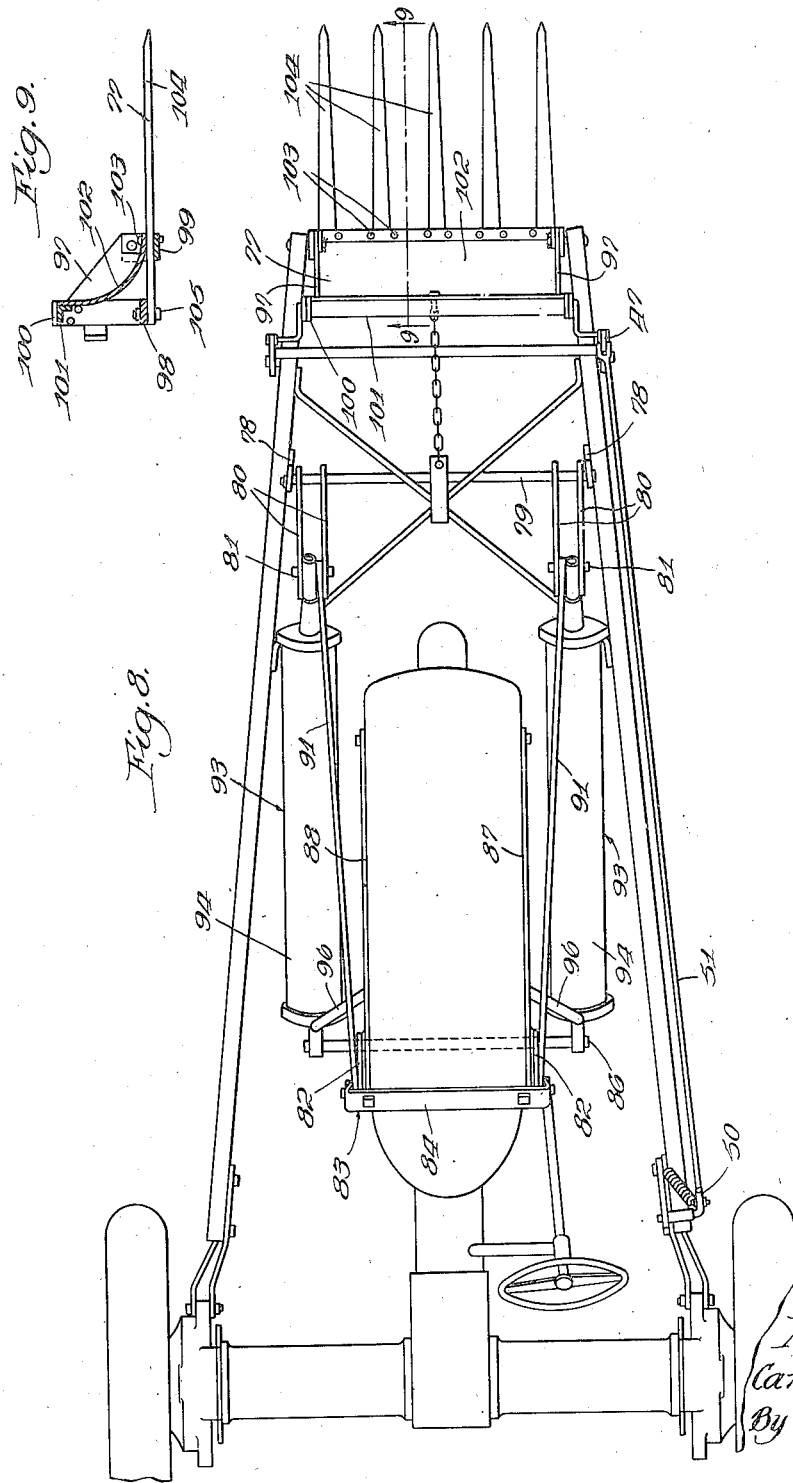

2,332,742

UNITED STATES PATENT OFFICE 2,332,742

LOAD-MOVING MACHINE

Carl W. Mott, La Grange, Ill., assignor to International Harvester Company, a corporation of New Jersey Application January 13, 1942, Serial No. 426,569

11 Claims. (Cl. 214—140)

This invention relates to a load-moving machine and particularly to a machine of the type mounted on a mobile frame and including a device adapted to gather and move material from storage heaps or other accumulations. Still more particularly the invention pertains to a load-moving machine of the type mounted on a tractor and including lifting mechanism operated from a power source on the tractor.

A usual type of tractor-mounted loader comprises forwardly extending beams carried at their rear ends on the tractor and including at their forward ends a scoop or other load-gathering element. The tractor includes a power source from which is driven power means adapted to raise the beams and load-carrying element. The load so raised may be transported in raised position; and the scoop element is mounted for release so that the load may be dumped.

The principal object of the present invention is to provide an improved load-moving machine including mechanism that is efficient in raising or otherwise moving loads gathered by the load-gathering device, this mechanism being preferably in the form of a structure comprising levers and including in the linkage thereof a power-operated or other force-exerting means adapted to swing the load-gathering device from one position to another.

It is an important object of the invention to provide such mechanism in a load-moving machine of the type that is mounted on a tractor or other vehicle.

The invention seeks as another object to provide an improved load-moving machine including a pair of force-exerting mechanisms, these mechanisms being preferably in the form of pneumatic or fluid-pressure devices.

Another object of the invention is to provide equalizing means operable between a plurality of force-exerting means so that the normally independent forces exerted by said means are equalized in the moving of the load-carrying device.

It is an important object of the invention to utilize, as force-exerting means, pneumatic pressure devices capable of resiliently supporting the load-carrying means in raised position.

Another object of the invention is to provide the construction just mentioned for use in a tractor mounted load-moving machine, in which case the resilient supporting of the raised device by the pneumatic means facilitates the handling of the raised load during transporting thereof.

Another object is to provide an improved load-carrying or scoop element having removable load-engaging means.

And, another object is to provide in a vehicle mounted load-moving machine a guide means serving to restrain relative transverse movement between the load-carrying means and the vehicle.

Briefly, and specifically, the foregoing and other important objects and desirable features of the invention are achieved in a preferred manner by an arrangement including in conjunction with a tractor, a pair of longitudinally extending beams connected at their rear ends to the tractor and having at their forward ends a load-carrying means in the form of a scoop or the like. The tractor frame provides a supporting base which serves to provide in conjunction with a plurality of link or lever means a polygonal lifting structure at each side of the tractor. Each lifting structure includes a force-exerting means, in one form of the invention consisting of a fluid-pressure device having a piston and cylinder expansible to vary or extend one side of the polygon for the purpose of raising the beams and the load-carrying means. Equalizing means is connected between the two lifting structures to equalize the forces applied by the force-exerting means. In another form of the invention the force-exerting means comprises a pneumatic pressure device including a piston and cylinder expansible to raise the beams and load-carrying means. Since the air or other gas employed to move the cylinder is compressible within the cylinder, a resilient supporting of the raised beams is achieved. By this means transporting of the raised load-carrying device is facilitated, the pneumatic device or devices absorbing the shocks resulting from the travel of the tractor over uneven ground.

A further understanding of the preferred forms of the invention may be had from the following detailed description in conjunction with the accompanying sheets of drawings, in which:

Figure 1 is a plan view, of one form of the invention, showing the improved machine in conjunction with a tractor;

Figure 2 is a side elevational view of the structure shown in Figure 1;

Figure 3 is a view similar to that in Figure 2 but showing the load-supporting beams and load-carrying means in raised position, the dumped position of the load-carrying means being indicated in broken lines;

Figure 4 is an enlarged transverse sectional view taken substantially along the line 4—4 of Figure 2 and showing a preferred form of equalizing means;

Figure 5 is a vertical sectional view taken substantially on the line 5—5 of Figure 4 and showing a portion of the guide means;

Figure 6 is a sectional view taken along the line 6—6 of Figure 4 showing another portion of the equalizing means;

Figure 7 is a side elevational view of a modified form of machine in which a pneumatic pressure device is employed in the lifting structure;

Figure 8 is a plan view of the structure shown in Figure 7; and

Figure 9 is a longitudinal sectional view taken substantially along the line 9—9 of Figure 8 and illustrating one form of scoop means having removable tines or fingers.

Although the invention has been illustrated and will be described in conjunction with its use on an agricultural tractor, it will be understood that in its broader aspects the invention may be similarly applied in conjunction with other vehicles or as a stationary machine. It will be appreciated further that the load-carrying means may be similarly employed in other instances for moving various materials and objects.

In the form of the invention shown in Figures 1 to 6, there is illustrated a tractor having a longitudinal main body or frame 20 including a transverse rear axle structure having oppositely extending transverse axle housings 21, each of which journals a drive axle 22. Each axle carries a drive wheel 23. The forward end of the body includes a steerable front structure 24 which includes a pair of closely spaced wheels. The body includes the usual hood and fuel tank structure generally indicated at 25 at the rear of which is carried on a support 26 a steering wheel and rod 27 associated in any conventional manner with the steerable front truck 24.

Each rear axle housing 21 carries supporting means in the form of a pair of brackets 28 secured together by bolts 29 to embrace the housing. The forward bracket member 28 has removably secured thereto by bolts 30 a vertical bracket member 31. A yoke member 32 includes a transverse upper portion 33 and a pair of downwardly extending legs 34, the lower ends of which are rigidly secured as at 35 to the bracket members 31 at each side of the rear axle structure. At each side of the tractor is provided a forwardly and downwardly extending brace member 36, the upper end of which is secured to an upper portion of the yoke member 32 and the lower end of which is rigidly secured to a forward portion of the tractor body or frame 20.

The load-moving structure includes a pair of transversely spaced, longitudinally extending beams 37. Each beam is pivotally connected at its rear end as at 38 to the respective bracket member 31 and extends forwardly beyond the front end of the tractor, at which point the beams are rigidly cross-braced by a pair of connecting braces 39. Each beam is provided at its extreme forward end with a transverse pivot member 40, the two members being transversely alined to provide pivot means on a transverse horizontal axis. This means serves to carry a load-carrying or load-gathering device, which is here shown as comprising a scoop member indicated generally by the numeral 41. The scoop includes a pair of transversely spaced, longitudinally extending side members 42 rigidly cross-connected at their rear ends by a transverse structure 43 including upstanding fingers or rods 44. A bottom or pan 45 is disposed generally horizontally between the sides of the frame member 42 and at its forward end is provided with a blade member 46. The rear transverse structure 43 is weighted and is heavier than that portion of the scoop between the pivot axis 40 and the blade 46. The weight means thus serves to maintain the unloaded scoop in normal or horizontal position. As will appear hereinafter, it will be seen that the weight of the loaded scoop overcomes the weight of the structure 43 so that the scoop may be dumped. Releasable means is provided for latching the scoop in normal or load-carrying position. This means preferably comprises an upstanding latch member 47 pivoted on a transverse pivot or rock-shaft 48 at the forward end of each beam and adjacent the rear end of the scoop 43. A similar latch member is provided adjacent the other beam at the other end of the rock-shaft, the rock-shaft serving as means for simultaneously operating both latch members. A hand lever 50 is pivotally carried at the rear end of the right-hand beam 37 within proximity to the operator's station at the rear of the tractor and is connected by a longitudinally extending link 51 to the right-hand latch member 47. A tension spring 52 is connected between the hand lever 50 and the right-hand beam 37 and serves to retain the hand lever 50 normally in its forward position and thus to retain the latch members 47 in locking position as respects the scoop 41. When the beams and scoop are raised, the hand lever may be operated to release the latches, in which case the loaded scoop pivots downwardly and forwardly to dump the load carried thereby. A flexible element in the form of a chain 53 is connected at one end to the rear end of the scoop 41 and at its other end, as at 54, to the intersection of the cross-brace members 39.

Each beam carries at a point just forwardly of the front truck 24 of the tractor an upstanding bearing bracket 55. These brackets serve to journal a transverse rock-shaft generally indicated at 56. The rock-shaft includes a transverse intermediate portion preferably in the form of a sleeve 57, the opposite ends of which are secured, as by welding, to transversely extending pivot members 58. As shown in Figure 6, the pivot members 58 are preferably disposed eccentrically with respect to the axis of the sleeve 57. At each end of the sleeve 57 the rock-shaft structure carries an upstanding arm 59. This arm is preferably welded to both the sleeve and to the proximate bearing member 58. The arm 59 provides part of a structure including a second and longer arm 60, the lower end of which is connected as at 61 to the arm 59. A bracing member 61a is connected at one end to the upper end of the arm 59 and at its other end as at 62 to an upper portion of the arm 60. The extreme upper end of the arm 60 is provided with a pivot pin 63 to which is connected one end of a link member 64. The other end of the member 64 is connected by a pin 65 to an upper portion of the yoke 32.

The rear end of each beam includes a supporting bracket 66 rigidly carried on and provided with a pivotal connecting means in the form of a transverse pivot pin 67. Each arm 60 includes between the points 62 and 63 a transverse pivot pin 68. Force-exerting means is connected between the points 67 and 68 at each side of the tractor, and each force-exerting means in conjunction with the yoke member 32 and link 64 provides a lifting structure for raising the beams 37 and the scoop 41, there being in a preferred form of the invention a similar lifting structure at each side of the tractor body. Each force-exerting means is preferably in the form of a fluid-pressure device including a cylinder 69 and a reciprocating piston 70. The cylinder is connected at its rear end to the pivot pin 67 in the bracket 66 on the respective beam 37, and the forward end of the piston is pivotally connected to the arm 60 by means of the pivot pin 68. The structure at both sides of the tractor is identical. The tractor includes a power plant of the usual type, generally indicated at 25a, which serves to operate a fluid pump, not shown, including a fluid supply conduit 71 at each side of the tractor. The conduits 71 are respectively connected to the cylinders 69 and supply fluid under pressure thereto in the usual manner. It will be understood, of course, that any force-exerting means may be employed in the lifting structure and that the fluid pressure devices illustrated are merely representative of such other devices.

An examination of Figures 2 and 3 will indicate that each lifting structure is in the form of a polygon, here a triangle, having its sides made up of the leg portion 34 of the yoke 32, the link member 64, and the cylinder and piston 69 and 70. It will be further noted that the side of the polygonal or triangular structure formed by the cylinder and piston is variable in length, in the present case expansible or extendible as the cylinder and piston are operated. Since the side of the lifting structure made up by the leg 34 of the yoke 32 is rigidly carried by the tractor, relative movement between the extensible members comprising the piston and cylinder moves the front corner of the triangle upwardly, as shown in Figure 3. The arm 60 serves as a means by which the scoop 41 is connected to this vertically movable corner of the lifting structure. Since the beams 37 are pivoted at their rear ends, the entire structure, including the beams and the scoop, is raised simultaneously. It will thus be seen that the lifting scoop may be attached directly to the forward corner of the lifting structure and that the beams 37 may be alternated. However, the beams perform an important function in enabling the scoop to be driven into an accumulation of material so that the necessary quantity of this material may be loaded on the scoop 41 simply by forward movement of the tractor.

It has been previously stated that the forward portion of the lifting structure comprising the arms 59 and 60 and the brace members 61 are rigidly carried in transversely spaced relation at opposite ends of the rock-shaft structure 56. Because of this connection, the rock-shaft serves as equalizing means between the lifting structures at opposite sides of the tractor and thus serves to equalize the normally independent forces applied by the fluid pressure devices. This structure is an important feature of the present invention and serves to eliminate uneven raising of the scoop 41, as might possibly occur in the event that one side of the scoop is subjected to heavier loads than the other side. The sleeve 57 is capable of withstanding the torsion applied independently thereto by one of the fluid pressure devices so that this pressure is transmitted again back to the opposite pressure device, with the result that the forces are equalized as aforesaid.

An intermediate portion of the rock-shaft structure carries a pair of transversely spaced collars 72, each of which is rigidly secured to the sleeve 57. A transverse member 73, preferably semicylindrical in cross-section, is loosely carried at its opposite ends by the collars 72 and thus may have angular movement with respect to the rock-shaft. This member has rigidly secured thereto an upstanding rod element 74, the upper end of which is slidably carried in a bearing member 75. The member 75 is pivoted on a transverse horizontal axis to an upstanding supporting bracket 76 rigidly carried at the forward end of the tractor body 20. The structure just described provides guide means which functions to restrain relative movement transversely between the beams 37 and the tractor body, thus assuring that the beams will be moved directly upwardly.

In the modified form of structure shown in Figures 7 and 8, it may be assumed for the purposes of description that the tractors are similar. Further similarity may be assumed as to the beams 37, forward pivot mounting 40 of a modified form of load-gathering means or scoop 77, and latching means comprising the lever 50, the link 51, and the latch members 47.

In the modified form just referred to, the equalizing means previously described may be eliminated. In this case, each of the beams 37 includes a forward journal bracket 78 which journals a transverse rock-shaft 79. Each end of the rock-shaft carries a pair of upstanding arms 80 cross-connected adjacent their upper ends by a transverse pivot pin 81. An intermediate portion of the tractor body includes a depending supporting structure having a pair of transversely spaced, downwardly extending supporting members 82, the lower ends of which are disposed at a level a substantial distance below the intermediate portion of the tractor body 20. A yoke member 83, including an upper transverse portion 84 and a pair of downwardly extending legs 85, is secured to the supporting members 87, the lower end of each leg 85 of the yoke being connected to a transverse rock-shaft 86 carried by the lower ends of the members 82. A pair of bracing members 87 is connected at opposite ends to the yoke and to the body to brace the yoke member 83 rigidly with respect to the tractor body. The supporting structure is further braced by a pair of downwardly and rearwardly extending brace members 88, one at each side of the tractor, each member 88 being connected at its forward end at 89 to the tractor and at its rearward end at 90 to a lower portion of a leg of the yoke 83.

At each side of the tractor body, there is arranged a link member 91 connected at its forward end to the pivot 81 of the upstanding arm 80 and at its rearward end connected to a pivot pin 90 on the respective leg 85 of the yoke 83. The link member 91 and the leg 85 of the yoke at one side of the tractor comprise parts of a polygonal lifting structure. It will be understood that there are similar lifting structures at each side of the tractor. Each lifting structure includes as means to form a third side of the polygon a force-exerting means, in this form of the invention, preferably in the form of a pneumatic pressure device 93 comprising a cylinder 94 and piston 95. The rear ends of the cylinders 94 are pivoted on the transverse rock-shaft 86 of the supporting structure intermediate the front rear ends of the tractor. The pistons 95 are respectively pivotally connected to the pivot pins 81 of the upstanding arms 80. The particular form of pneumatic pressure device illustrated is operated by exhaust gases from the tractor power plant. A device of this type is disclosed in assignee's copending application, Serial No. 353,099, filed August 17, 1940. It will be understood that any similar device may be suitably employed and a description of the illustrated device is only general. The gas is supplied to the cylinders 94 by means of conduits 96, and the supply of gas may be controlled in any suitable manner.

The operation of the lifting structure including the pneumatic devices is very similar to that described in conjunction with the structure in Figures 1 and 2. In the case of the pneumatic lifting devices, however, the gas, being compressible in the cylinders 94, is capable of providing a cushioning means for supporting the raised beams 37 and scoop 77. This is an important feature of the invention when the load-moving mechanism is employed with a tractor or other mobile frame, since the cushioning effect of the pneumatic device supports the raised load-carrying device in such a manner as to eliminate the transmission of many severe shocks to the tractor or other transportable frame.

The modified construction shown in Figures 7 and 8 is also illustrated as including the modified form of scoop 77. It will be understood, of course, that this scoop may be similarly used in the structure shown in Figures 1 and 2. As illustrated, this scoop includes a pair of transversely spaced plate members 97. These plates are rigidly cross-connected at their lower portions by a pair of transversely extending parallel members 98 and 99. The plates are also cross-connected at their upper ends by a supporting member 100 including as an additional part thereof a transverse angle bar 101. The upper member 100 and the front member 99 serve to carry an arcuate load-supporting member or pan 102. The upper edge of this pan is secured to the member 100. The lower forward edge of the pan 102 is spaced slightly above and parallels the front member 99. A plurality of securing means in the form of rivets or the like 103 are disposed in transversely spaced relation and rigidly secure the front edge of the arcuate member 102 to the member 99. The load-gathering means of the scoop presently described includes a plurality of longitudinally extending tines or fingers 104. The rearward ends of the fingers are fitted between the spaced-apart members 99 and 102, each finger passing through the pair of spaced rivets 103. The rearward end of each finger is secured to the member 98 by removable means preferably in the form of a bolt 105. The structure thus provides for the removal of the fingers or tines 104 so that the same may be replaced in the event of wear or breakage. The relation between the fingers 104, the rivets 103, and the bolts 105 is such as to secure the fingers rigidly but removably in place, the rivets 103 preventing transverse displacement of the fingers.

In the operation of either of the forms of the invention illustrated, the pressure devices include the relatively extendible members, such as the cylinder and piston 69 and 70, or the cylinder and piston 94 and 95, so that the side of a triangle or other polygonal lifting structure may be extended. The arrangement of the linkage forming the lifting structure is such as to provide tremendous leverage upon initial raising of the load-carrying device. The arrangement of linkage further provides for increased elevation of the beams and scoop as the same are raised to load-transporting or load-dumping position. In the case of the pneumatic pressure devices the raised beams and scoop are resiliently supported on the cushions provided by the compressible volumes of gas in the cylinders 94. In other respects the use and operation of the two forms of load-moving machine are very similar. As previously stated, the scoops 41 and 77 may be readily interchanged and installed in either structure.

It will be seen from the foregoing description that an improved load-moving machine has been provided and that the same has been represented in two preferred forms of the present invention. It will be understood, of course, that the illustrated structures are only preferred forms of the invention and that numerous modifications and alterations may be made therein without departing from the spirit and scope of the appended claims.

What is claimed is:

1. A load-moving machine comprising a supporting frame; a member rigidly carried by the frame and upstanding therefrom; a link pivoted at one end on the member; a pair of relatively extensible members; means pivotally connecting one member to the other end of the link; means pivotally connecting the other member of said pair to the supporting frame, said link, upstanding member and pair of members forming three sides of a polygon structure and said pair of members being relatively extendible to vary the length of one side of said structure to move upwardly the corner of said structure formed by the connection between the link and one of said pair of members; a load-carrying element; and means connecting said element to said corner of the structure.

2. In combination, a supporting frame; a pair of lifting means, one at each side of said frame; each means comprising a generally polygonal structure mounted on the frame; each structure including a member rigidly carried by the frame and extending away therefrom and forming one side of the polygon, a link pivotally connected at one end to the remote end of said member and forming a second side of the polygon, and force-exerting means between the end of the first member adjacent the base and the other end of the link and forming a third side of said polygon; each of said means including a pair of members movable relatively to vary the length of said third side of the polygon to move, through the plane of the respective polygon, the corner formed at the second and third sides; a load-carrying element; means connecting said element at opposite sides to each of the aforesaid corners; and means connecting said corners to equalize the forces applied to the polygonal structures upon operation of the force-exerting means.

3. In combination, a supporting frame; a pair of lifting means, one at each side of said frame; each means comprising a generally polygonal structure mounted on the frame; each structure including a member rigidly carried by the frame and extending away therefrom and forming one side of the polygon, a link pivotally connected at one end to the remote end of said member and forming a second side of the polygon, and force-exerting means between the end of the first member adjacent the base and the other end of the link and forming a third side of said polygon; each of said means including a pair of members movable relatively to vary the length of said third side of the polygon to move, through the plane of the respective polygon, the corner formed at the second and third sides; a load-carrying element; means connecting said element at opposite sides to each of the aforesaid corners; and means connected between the supporting frame and the lifting means to restrain relative movement between said frame and lifting means transversely of the planes of the polygonal structures.

4. In combination, a supporting frame; a pair of lifting means, one at each side of said frame; each means comprising a generally polygonal structure mounted on the frame; each structure including a member rigidly carried by the frame and extending away therefrom and forming one side of the polygon, a link pivotally connected at one end to the remote end of said member and forming a second side of the polygon, and force-exerting means between the end of the first member adjacent the base and the other end of the link and forming a third side of said polygon; each of said means including a pair of members movable relatively to vary the length of said third side of the polygon to move, through the plane of the respective polygon, the corner formed at the second and third sides; a load-carrying element; means connecting said element at opposite sides to each of the aforesaid corners; means connecting said corners to equalize the forces applied to the polygonal structures upon operation of the force-exerting means; and means connected between the supporting frame and the lifting means to restrain relative movement between said frame and lifting means transversely of the planes of the polygonal structures.

5. In combination, a tractor having a frame including a transverse rear axle structure; a beam pivoted at its rear end on the axle structure and extending forwardly of the tractor; a load-carrying element connected to the front end of the beam; and means carried by the tractor frame for moving the beam and element vertically, comprising a polygonal structure, a portion of the beam forming one side of the polygon; an upstanding link pivoted at one end to a forward portion of the beam and forming a second side of the polygon; force-exerting means forming a third side of the polygon; means connecting said means to the upper end of the link; means connecting said means to a rearward portion of the beam; said force-exerting means including a pair of members movable relatively to vary said third side of the polygon to move the beam vertically about its pivot on the tractor rear axle.

6. In combination, a tractor having a longitudinal body; a pair of longitudinal beams connected at their rear ends to the tractor body for vertical movement with respect to the body and extending forwardly along opposite sides of the body; a load-carrying element; means connecting said element to the forward ends of the beams; an upstanding arm connected at one end to a forward portion of a beam; supporting structure carried by the tractor body intermediate the front and rear ends of the body and depending below the body; lifting means for raising the beams including force-exerting means operable along a line of force extending upwardly and forwardly between the depending supporting structure and the upstanding arm; means connecting the lifting means to the arm; and means connecting the lifting means to the supporting structure.

7. In combination, a tractor having a longitudinal body; a pair of longitudinal beams connected at their rear ends to the tractor body for vertical movement with respect to the body and extending forwardly along opposite sides of the body; a load-carrying element; means connecting said element to the forward ends of the beams; a link pivotally connected to and extending upwardly from a forward portion of a beam; supporting structure carried by the tractor body intermediate the front and rear ends of the body and depending both above and below the body; a second link pivotally connected between an upper part of the supporting structure and an upper part of the first link; lifting mechanism connected between the supporting structure and the said links, adjacently to their pivotal connection to one another, for raising the beams and including a pneumatic pressure device having a cylinder and piston relatively movable along a line of force inclining upwardly and forwardly between the supporting structure and the connection with said links.

8. In combination, a tractor including a longitudinal body; a pair of beams connected at their rear ends to the tractor body and extending forwardly along opposite sides of the body; load-carrying means at the forward ends of the beams; a transverse rock-shaft journaled on said beams at their forward portions; a pair of arms spaced axially of the rock-shaft; means rigidly securing said arms to the rock-shaft; a pair of transversely spaced lifting means for raising the beams; means securing each lifting means at one end to a respective arm; and means securing the lifting means to the tractor body.

9. In combination, a tractor including a longitudinal body; load-carrying means at the forward ends of the tractor arranged for vertical movement with respect to the tractor; a transverse rock-shaft journaled on the load-carrying means; a pair of arms spaced axially of the rock-shaft; means rigidly securing said arms to the rock-shaft; a pair of transversely spaced lifting means for moving the load-carrying means vertically; means securing each lifting means at one end to a respective arm; and means securing the lifting means to the tractor body.

10. A scoop for a load-moving device, comprising front and rear parallel members; a load-supporting member disposed above said members and having a forward edge portion parallel to and spaced above the front member; a plurality of transversely spaced securing elements securing the forward edge of the load-supporting member and the front member in spaced relation as aforesaid; load-gathering means including a plurality of transversely spaced fingers arranged between the front member and the forward edge of the load-supporting member and between certain of the spaced securing elements; and means removably securing certain of said fingers to the rear member.

11. A scoop for a load-moving device, comprising a pair of parallel members; a load-supporting member having an edge portion parallel to and spaced vertically from one member; a plurality of securing elements spaced along said member securing said edge of the load-supporting member and said one member in spaced relation as aforesaid; load-gathering means including a plurality of transversely spaced fingers arranged between said one member and the said edge of the load-supporting member and between certain of the spaced securing elements; and means removably securing certain of said fingers to the other member.

CARL W. MOTT.